United States Patent
Oh et al.

(10) Patent No.: US 6,430,360 B1
(45) Date of Patent: Aug. 6, 2002

(54) METHOD AND APPARATUS FOR BLOCKING REPRODUCTION OF VIDEO TITLE IN OPTICAL DISK PLAYER

(75) Inventors: Kun-Young Oh; Seong-Ju Lee, both of Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,819

(22) Filed: Aug. 20, 1999

(30) Foreign Application Priority Data

Aug. 22, 1998 (KR) .......................................... 98-34343

(51) Int. Cl.⁷ ................................................ H04N 5/91
(52) U.S. Cl. .......................... 386/94; 386/125; 711/164
(58) Field of Search .............................. 386/46, 94, 95, 386/125–126; 711/164, 163; 713/184; 380/202, 203; H04N 5/91

(56) References Cited

U.S. PATENT DOCUMENTS 5,400,077 A  *  3/1995  Cookson et al. ............ 348/556
5,610,653 A  *  3/1997  Abecassis .................... 725/30
5,799,145 A  *  8/1998  Imai et al. ................... 713/202
6,009,433 A  * 12/1999  Kurano et al. .............. 711/163

* cited by examiner

*Primary Examiner*—Vincent Boccio
(74) *Attorney, Agent, or Firm*—Birch, Stewart, Kolasch & Birch, LLP

(57) ABSTRACT

This invention relates to a method of selectively blocking the reproduction of a video title, based on a password entered by a user, in a reproduction apparatus for playback of an optical disk on which several different versions for specific sections of a video title are recorded, such versions differing from each other in contents and rating level. The invention, e.g., checks whether a password entered is correct or not for the chosen/desired rating level; and reproduces video data corresponding to a predetermined rating level that is different than the chosen rating level when a password entered is not correct for the chosen rating level. Accordingly, this invention provides an effective way of preventing reproduction of video titles with offensive or inappropriate material by restricting opportunities of re-entering password when a password entered is not correct for the chosen rating level.

18 Claims, 6 Drawing Sheets

METHOD AND APPARATUS FOR BLOCKING REPRODUCTION OF VIDEO TITLE IN OPTICAL DISK PLAYER

BACKGROUND OF THE INVENTION

1. Field of the Invention

This invention relates to apparatus and method for selectively blocking the reproduction of a video title, based on a password entered by a user, in a reproduction apparatus for playback of an optical disk on which several data blocks for specific sections or parts of a single title are recorded, such data blocks differing from each other in contents and rating level.

2. Description of the Related Art

FIG. 1 depicts a functional block diagram of an optical disk reproduction apparatus to which a preferred embodiment of the present invention is applied, comprising an optical pickup 2 for reading out information recorded in an optical disk 1 by using a light beam irradiated by an LED; a spindle motor 3 for rotating the optical disk; a sled motor 4 for moving the optical pickup in the radial direction of the optical disk; a driving unit 8 for driving the sled motor and the spindle motor; an radio-frequency (RF) processing unit 5 for filtering and shaping the signal picked up by the optical pickup into binary signals; a sync-clock generator 6 for synchronizing its clock with the binary signals; a servo unit 7 for servo-controlling the driving unit; a digital signal processor 9 for processing the binary signals on the basis of the synchronized clock and then extracting an MPEG-encoded moving picture data; an MPEG decoder 10 for decoding the MPEG-encoded moving picture into audio and video signals; a memory 13 for storing a password, or identification number ("PIN") entered by a user; a microcomputer (microcomputer) 11 for controlling reproduction operation based on a result of comparison between the stored password and the password entered; a keypad 14 for inputting a command of a user; and on screen display (OSD) unit for outputting the comparison result on a screen of the reproduction apparatus.

For such an optical disk reproduction apparatus, once a user enters a password or PIN through the keypad 14, the password is stored in the memory 13 under control of the microcomputer 11. After that, if a user requests the reproduction of an optical disk, the prescribed message like "Enter password" is retrieved from an OSD character data set stored in the memory 13 and is then applied to the OSD unit 12 for display.

Then, the OSD unit generates character image signal corresponding to the message to ask the user to enter a password. Once a password is entered, the microcomputer 11 compares the password stored in the memory 13 with a password entered.

If it is determined that they are identical, the microcomputer 11 controls the servo unit 7 and driving unit 8 so that the optical pickup 2 is moved to a prescribed track on the optical disk 1 and starts to read out recorded data thereon. The read-out data is decoded into moving picture data by the RF processing unit 5 and digital signal processing unit 9. The moving picture data is then decoded into audio and video signals by the MPEG decoder 10.

On the other hand, if they are not matched, the microcomputer 11 retrieves a message like invalid password "out of the OSD character data set and then sends it to the OSD unit 12. The OSD unit 12, in turn, generates and outputs the corresponding character image signal so that the user is asked to re-enter a password.

Meanwhile, an optical disk 1 is generally composed of a video data storage region for storing at least one video data sequence, wherein each video data sequence has a plurality of video segments of a reproduction period, a plurality of sub-pictures and a plurality of control procedures, and a management information storage region which stores management information such as video management information (hereinafter, VMGI) or video title setting information (hereinafter, VTSI). A program chain (hereinafter, PGC) addressing video data block, that is a list of video objects (VOBs), which specifies their reproduction order, is provided in such an optical disk. By setting the PGC sequence, it is possible that video objects are organized such that reproduction of several video data blocks are provided with different contents, as shown in FIG. 2.

Video titles or video/audio contents on them are, generally, classified into three ratings: "adult", "parental guidance" (hereinafter PG), and "kids safe" ratings in terms of their contents.

FIG. 3 shows a flowchart of a password-based conventional art method of blocking offensive or inappropriate material from being displayed in a reproduction apparatus. For the conventional art method, the reproduction of the inappropriate material is performed only when a password entered matches the stored password in the apparatus. If they are mismatched, a message indicating that the password entered is not correct is displayed on a screen of the apparatus, thereby the reproduction being not allowed until a correct password is entered by a user.

It is common that the conventional art method asks a user to enter the correct password repeatedly if the password entered is not correct. In other words, repetitive guessing of the correct password is not prohibited and thus the correct password can, by chance, be figured out. Therefore, a new method of restricting chances of re-entering a password is needed to effectively prevent video data with offensive or inappropriate material from being reproduced by children or teenagers.

SUMMARY OF THE INVENTION

The invention, in part, provides a method of selectively blocking reproduction of a video title by restricting chances of re-entering a password when a password entered by a user is not correct. In addition, when the password is not entered correctly, no warning message is displayed or the same message is displayed as in the case of password matching.

The invention provides, in part, an apparatus for and corresponding method of selectively blocking reproduction of a part of a video title, the method comprising the steps of checking whether a password entered is correct or not for a chosen rating level; and reproducing, for a part of said video title having two or more alternate data blocks of different rating levels, respectively, one of said data blocks that is of a different rating level than a rating level corresponding to the password when the password entered is incorrect.

The invention also provides, in part, an apparatus for and corresponding method of selectively blocking reproduction of a part of a video title according to the present invention comprises the steps of checking whether a password entered is correct or not for a chosen rating level; and reproducing contents of a rating level that are different than a chosen rating level for part of the video title whenever the part contains blocks corresponding to two or more rating levels, respectively, when the password entered is incorrect.

According to methods embodying the present invention, a user is asked to enter a password to watch a video title.

Once a password is entered, a comparison is then made to check whether or not the password entered is correct. If the password is correct, the contents of the video title corresponding to a rating level that the user chose starts to be reproduced. Otherwise, predetermined contents provided in the video title, for example, a "kids safe" version, are reproduced without giving a chance to re-enter a password.

The invention also provides, in part, an apparatus for and corresponding a method of selectively blocking reproduction of a part of a video title, wherein a user must enter a password to be able to view scenes corresponding to a chosen rating level. Such a method comprises: checking whether the password is correct or incorrect for the chosen rating level; and not displaying a data block having the chosen/desired rating level for that particular part of the video title when the password is entered incorrect.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings.

DESCRIPTION OF THE PREFERRED EMBODIMENTS

Figure 1:
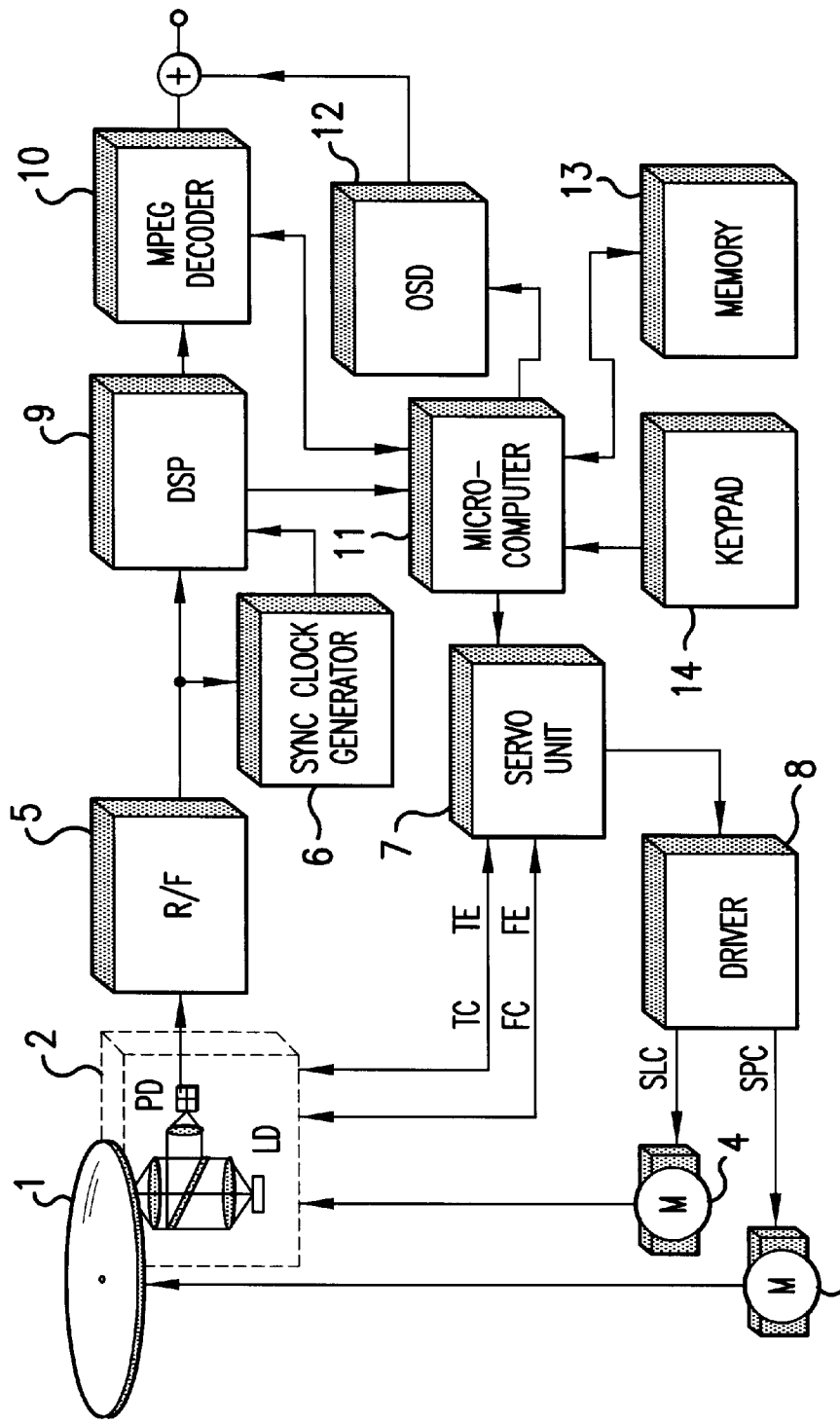
FIG. 1 is a block diagram showing a conventional general optical disk reproduction apparatus.
Figure 4:
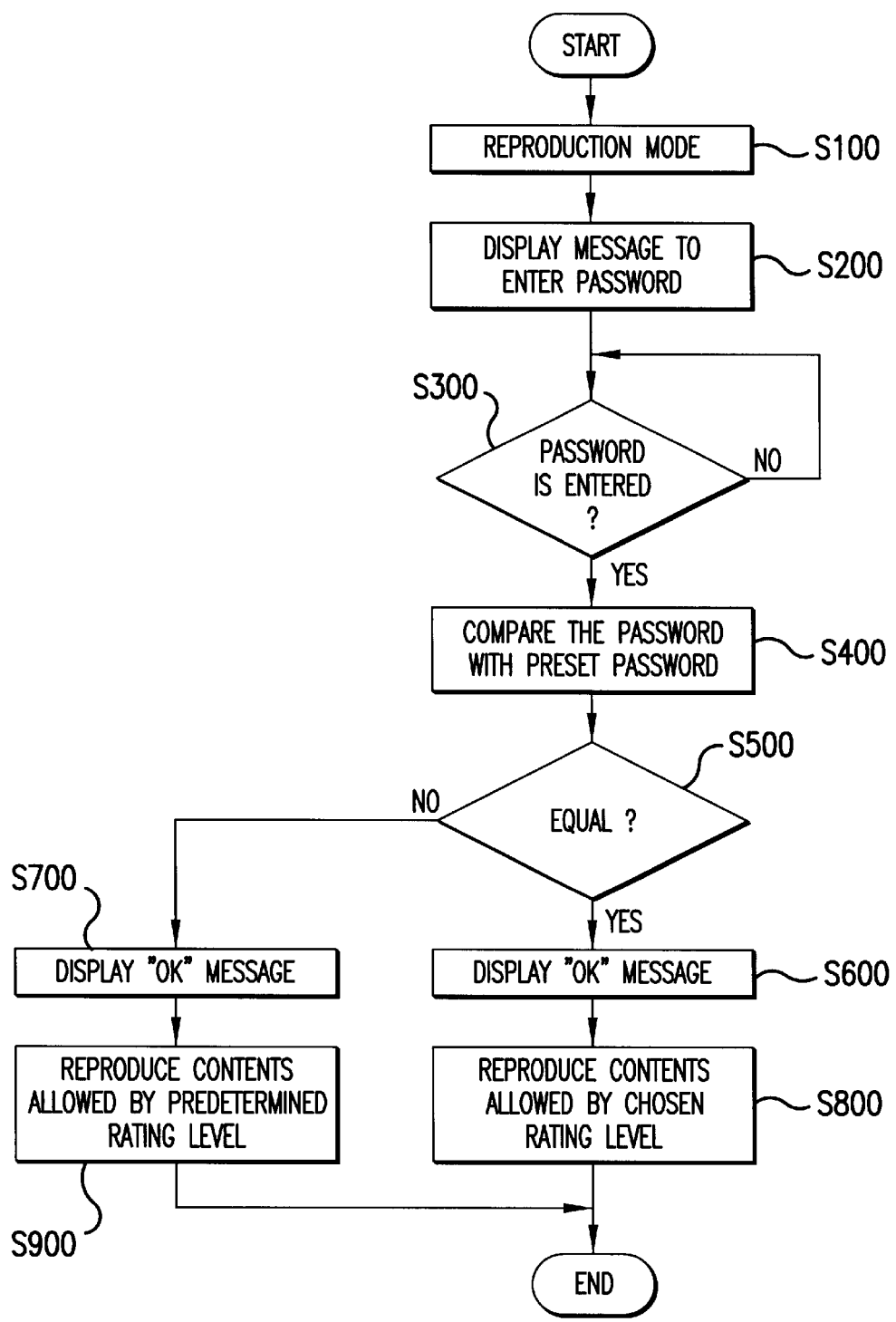
FIG. 4 is a flowchart of a method of selectively blocking reproduction of a video title according to the present invention.
Figure 5:
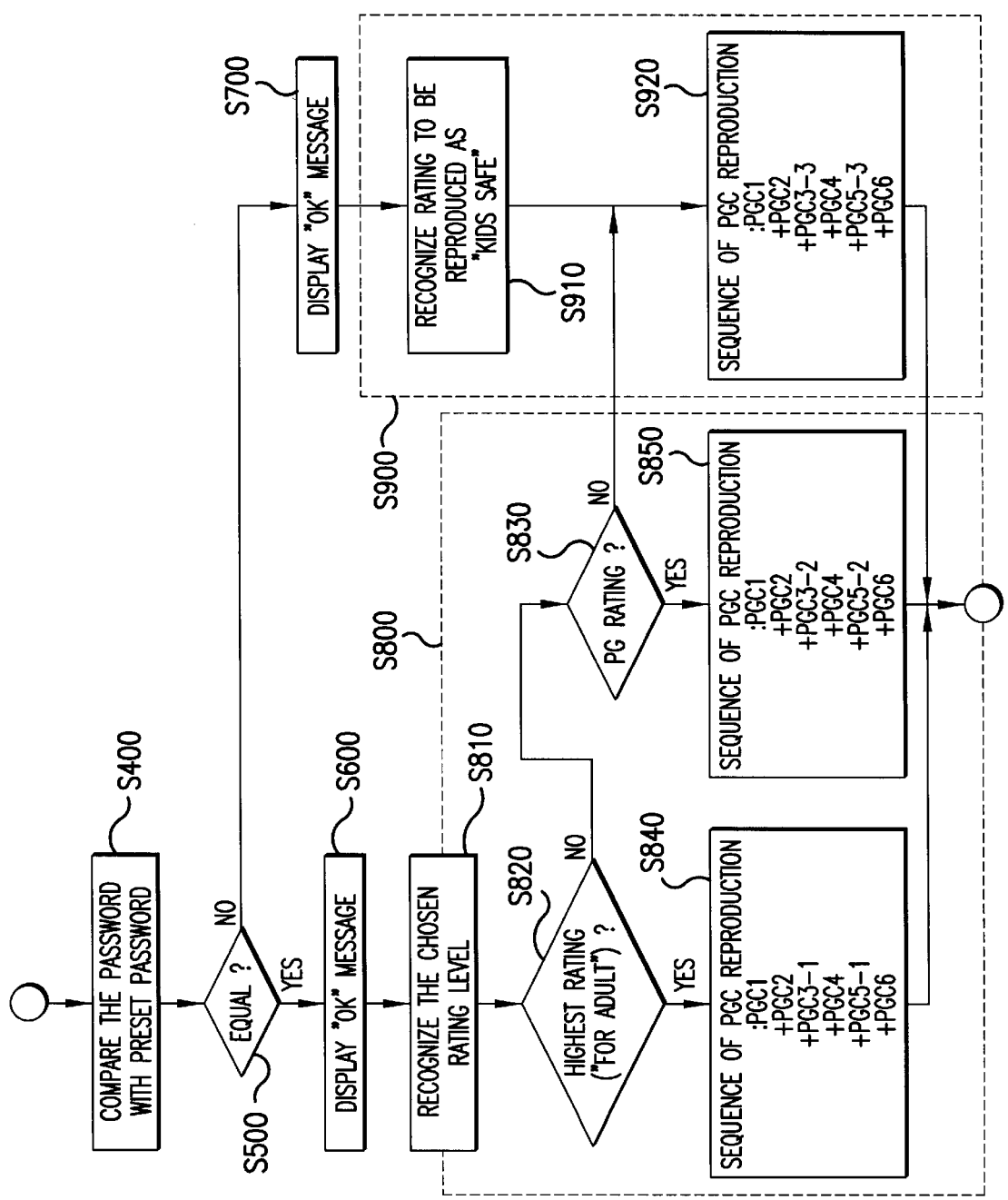
FIG. 5 is a flowchart showing details of part of the flowchart of FIG. 4.
Figure 6:
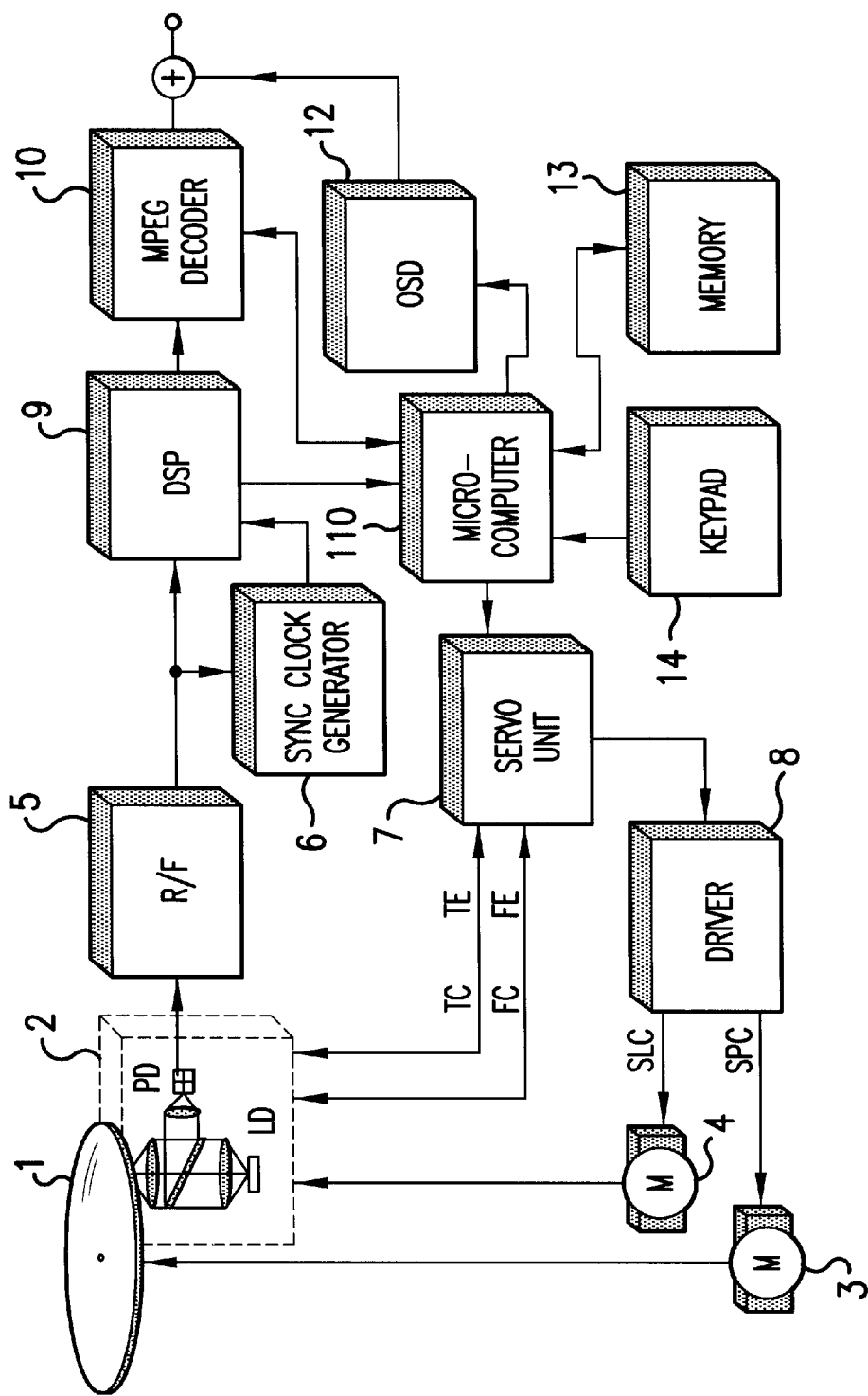
FIG. 6 is a block diagram showing an optical reproduction apparatus according to the invention.

The preferred embodiments of the present invention will be described in detail referring to the apparatus of FIG. 6 and the flowcharts of FIGS. 4 and 5. FIG. 6 differs primarily from FIG. 1 by the microcomputer 110. Aspects of FIG. 6. that are the same as FIG. 1 have the same item numbers.

In the reproduction mode (S100) of the apparatus of FIG. 6, a user is asked to enter a password (S200) corresponding to the chosen/desired rating level. Once the user enters a password (S300), a comparison is made by the microcomputer 110 to check whether the password entered matches the password stored in the apparatus (S400).

If it is determined that the password entered is correct (S500), an "OK" message is displayed (S600) and then the microcomputer 110 drives the optical disk through the servo unit 7 so that the recorded signal is reproduced into audio/video data through the RF processing unit 5, the digital signal processor 9, and the MPEG decoder 10 (S800). On the other hand, in the case where the password entered is incorrect for the chosen rating level, a warning message is not displayed and/or an OK" message is displayed, as in the case that the correct password is entered (S700). After that, the program chain associated with a "kids safe" or other predetermined non-adult rating contents in the video title is set to the chain of data stream to be decoded in the MPEG decoder 10 and then video data containing the "kids safe" or other predetermined non-adult rating contents are reproduced (S900).

Figure 2:
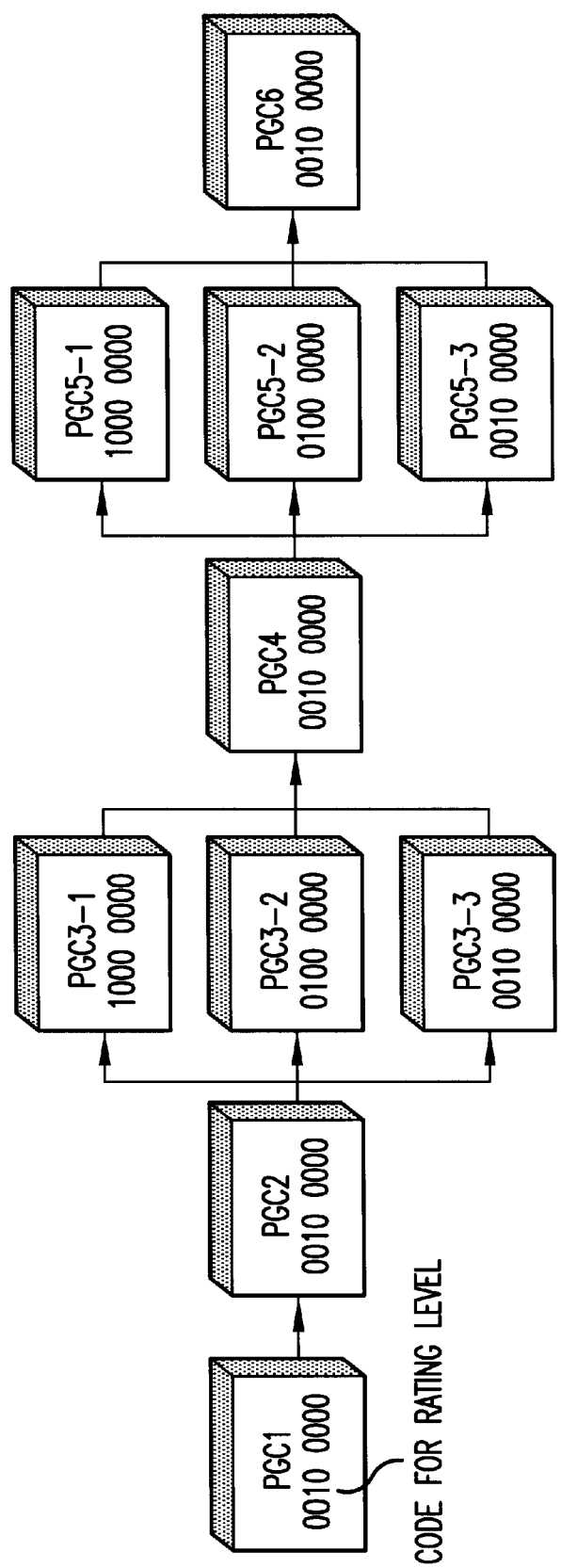
FIG. 2 is a schematic diagram showing the reproduction order of program chains associated with three different rating levels.
Figure 3:
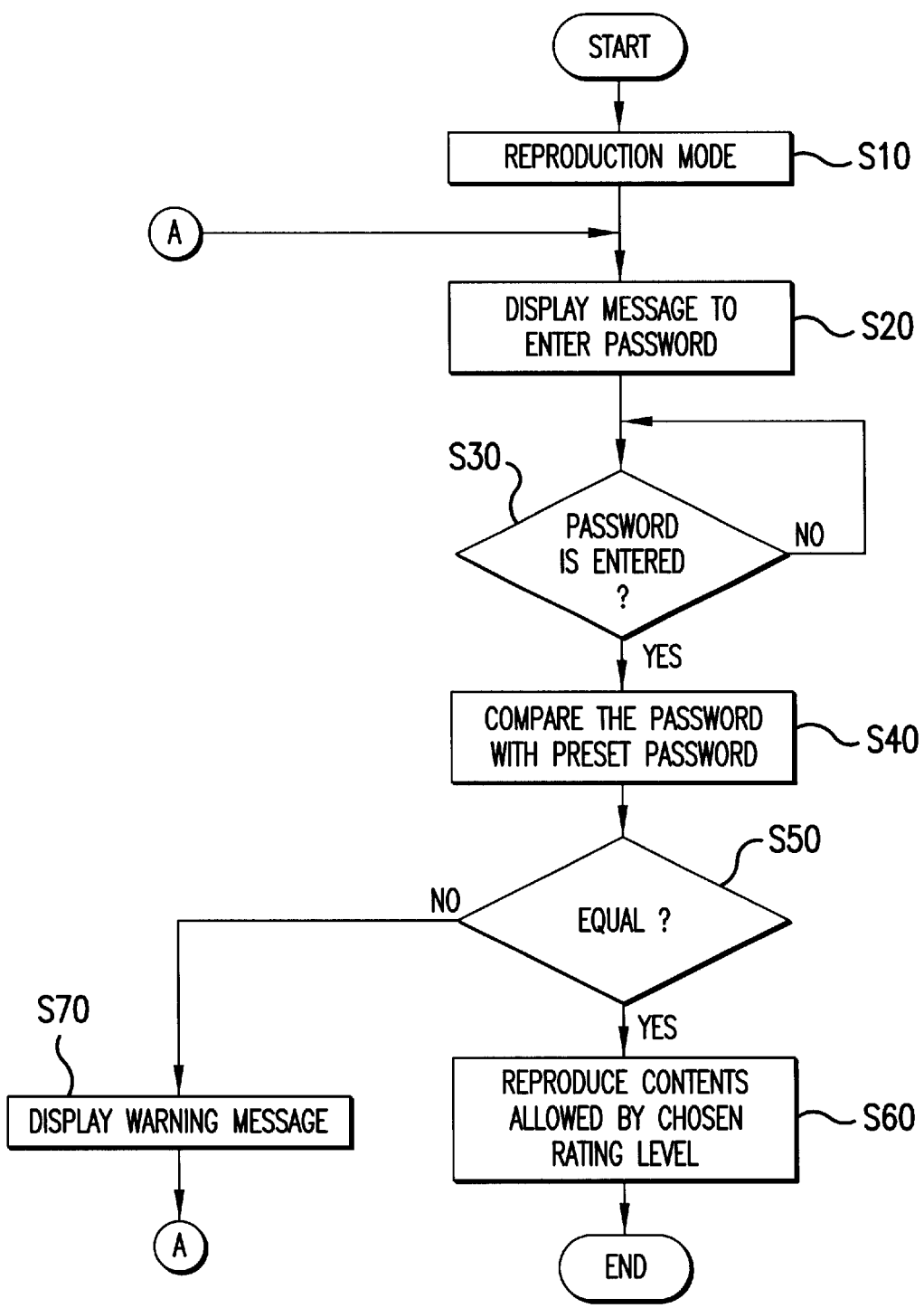
FIG. 3 is a flowchart of the conventional art password-based method of selectively blocking reproduction of a video title.

More details are described below with reference to FIG. 2 and FIG. 5. If the password entered by a user matches the password stored in a memory in the reproduction apparatus for the chosen rating level, the microcomputer 110 retrieves a rating level that the user chose (S810). If it is determined that the rating level allowed through the matched password is "adult" rating (S820), the microcomputer 110 controls the MPEG decoder 10 so that data streams belonging to the program chains containing PGC3-1 and PGC5-1 whose rating levels are "adult" in FIG. 2 are reproduced. Therefore, PGC1+PGC2+PGC3-1 +PGC4+PGC5-1+PGC6 shown in FIG. 2 are selected out of data streams produced by the digital signal processor 9 and then reproduced sequentially. The program chains PGC1, PGC2, PGC4 and PGC6 have single data block corresponding to the "kids safe" rating, respectively.

Meanwhile, instead of informing the MPEG decoder 10 of the rating level information, it is possible that only video objects belonging to the program chains of the chosen rating level are read out from the optical disk by using the optical pickup 2 and the digital signal processor 9 and that they are all reproduced sequentially by the MPEG decoder 10. The storage location information of the video objects belonging to the program chains on the optical disk is obtained from management information such as VMGI or VTSI which has been already read out and stored in the memory 13.

If the rating level is "PG" rating (S830), the microcomputer 110 controls the MPEG decoder 10 so that only data streams belonging to program chains whose rating is "PG", i.e., data streams belonging to the chains PGC3-2 and PGC5-2 whose rating levels are "PG" are selected and reproduced in the data section correspondent to PGC3.

Thus, in FIG.2, data stream of PGC1+PGC2+PGC3-2+ PGC4+PGC5-2+PGC6 are selected and reproduced sequentially. If the rating level allowed through the matched password is neither "adult" nor "PG", data streams belonging to program chains of a kid-safe rating containing PGC3-3 and PGC5-3 (e.g., PGC1+PGC2+PGC3-3 +PGC4+ PGC5-3+PGC6 shown in FIG. 2) are reproduced.

Even if the password entered does not match the password stored in the memory 13 for the chosen rating level, a warning message indicating that the password entered is not correct is not displayed and thus chances of re-entering password are no longer provided. At this time, the microcomputer 110 sets the MPEG decoder 10 so that only video streams belonging to program chains of non-adult, e.g., a kid-safe, rating (e.g., PGC1+PGC2+PGC3-3+hi PGC4+ PGC5-3+PGC6 shown in FIG. 2) are decoded sequentially by the MPEG decoder 10.

In a case where there is no video data corresponding to a kid-safe rating on the optical disk, program chains associated with the lowest rating level excluding the "adult" rating are selected. The reproduction of the video title on the optical disk is prohibited if only "adult" rating is available on video contents of the optical disk. In case where the video title contains parts having only "adult" material, such parts or video objects corresponding to the "adult" material are skipped during reproduction. In other words, parts of the video title having only the adult rating are not reproduced at all.

Meanwhile, despite the password being incorrect for the chosen rating, the microcomputer 110 displays the same message as that of the case where a correct password is entered, e.g., "OK! Passed" through the OSD unit 12, not a warning message. Alternatively, if a password is entered that is incorrect for the chosen rating level, then a prompt such as, e.g., "Non-Adult Rating Permitted," is displayed.

Although the foregoing embodiment has been described with a reproduction apparatus for playback of optical disks on which management information such as VMGI or VTSI for reproduction of recorded program is provided, the present invention can be embodied in a reproduction apparatus for other information storage media such as digital video cassette.

Thus, the present invention provides an effective way of preventing video titles with offensive or inappropriate material from being reproduced by children or teenagers by restricting chances of re-entering password when password entered is not correct.

The foregoing is provided only for the purpose of illustration and explanation of the preferred embodiments of the present invention, so changes, variations and modifications may be made without departing from the spirit and scope of the invention.

What is claimed is:

1. A method of selectively blocking reproduction of a part of a video title, the method comprising:

(a) checking whether a password entered is correct or not for a chosen rating level; and (b) reproducing, for a part of said video title having two or more alternate data blocks of different rating levels, respectively, one of said data blocks that is of a different rating level than a rating level corresponding to the password when the password entered is incorrect.

2. A method according to claim 1, wherein said step (b) reproduces a data block whose contents correspond to a non-adult rating if the password entered is incorrect.

3. A method according to claim 1, wherein said step (a) further comprises the step of displaying the same message as in the case where the password entered is correct even when the password entered is incorrect.

4. A method of selectively blocking reproduction of a part of a video title, comprising the steps of:

(a) checking whether a password entered is correct or not for a chosen rating level; and (b) reproducing contents of a rating level that is different than a chosen rating level for part of the video title whenever the part contains blocks corresponding to two or more rating levels, respectively, when the password entered is incorrect.

5. A method according to claim 4, wherein said step (b) reproduces contents corresponding to a non-adult rating level.

6. An apparatus for selectively blocking reproduction of a part of a video title on an information storage medium, comprising:

reproduction circuitry to read out recorded data from the information storage medium and to convert the recorded data into video data;

a memory to store at least one preset password; and a controller to control the reproduction circuitry to output video data of a predetermined rating level different than a chosen rating level if a password provided thereto by a user does not match a password that is stored in said memory for the chosen rating level.

7. An apparatus according to claim 6, wherein said controller controls said reproduction circuitry to convert recorded signals of a predetermined rating level read out from the information storage medium into video data.

8. An apparatus according to claim 6, wherein said controller controls said reproduction circuitry to read out recorded signals corresponding to a predetermined rating level from said information storage medium and convert the read-out signal into video data.

9. An apparatus according to claim 6, wherein said predetermined rating level is the lowest rating level provided in video title on the information storage medium.

10. An apparatus according to claim 9, wherein if the lowest rating level is an adult rating level, the corresponding video data is not reproduced.

11. A method according to claim 2, wherein a data block corresponding to a kid-safe rating is reproduced if the password is incorrect.

12. A method according to claim 4, wherein said step (b) reproduces contents having a kid-safe rating.

13. A method according to claim 4, further comprising providing a selection mode in which a rating level of the video title to m be reproduced is chosen.

14. A method of selectively blocking reproduction of a part of a video title, wherein a user must enter a password to be able to view scenes corresponding to a chosen rating level, the method comprising:

checking whether the password is correct or incorrect for the chosen rating level; and not displaying, for said part of said video title, a data block having the desired rating level when the password is entered incorrectly.

15. The method of claim 14, wherein if a part of the video title has only a data block with a rating level corresponding to the chosen rating level, then displaying no data block for said part of the video title.

16. The method of claim 14, further comprising:

displaying a data block having a rating level that is different than the chosen rating level when the entered password is incorrect.

17. The method of claim 16, wherein said data block of the different rating level is a data block having a non-adult rating.

18. The method of claim 17, wherein said non-adult rating is a kid-safe rating.

* * * * *